US006392431B1

(12) United States Patent
Jones

(10) Patent No.: US 6,392,431 B1
(45) Date of Patent: *May 21, 2002

(54) FLEXIBLY SUSPENDED HEAT EXCHANGE HEAD FOR A DUT

(75) Inventor: Elmer R. Jones, North Reading, MA (US)

(73) Assignee: Aetrium, Inc., North St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,098
(22) PCT Filed: Oct. 23, 1996
(86) PCT No.: PCT/US96/16930
§ 371 Date: Jun. 22, 1998
§ 102(e) Date: Jun. 22, 1998
(87) PCT Pub. No.: WO97/15837
PCT Pub. Date: May 1, 1997

(51) Int. Cl.[7] .............................................. G01B 31/02
(52) U.S. Cl. ........................ 324/760; 324/761; 324/754; 324/158.1
(58) Field of Search ................................. 324/760, 754, 324/761, 158.1

(56) References Cited

U.S. PATENT DOCUMENTS

| 4,274,476 A | | 6/1981 | Garrett |
|---|---|---|---|
| 4,839,587 A | * | 6/1989 | Flatley et al. ................ 324/760 |
| 4,854,377 A | | 8/1989 | Komoto et al. |
| 4,897,763 A | | 1/1990 | Denzler |
| 4,918,928 A | | 4/1990 | Morioka et al. |
| 4,949,219 A | | 8/1990 | Moriizumi et al. |
| 4,951,740 A | * | 8/1990 | Peterson et al. ............... 165/32 |
| 4,987,365 A | | 1/1991 | Shreeve et al. |
| 5,084,671 A | | 1/1992 | Miyata et al. |
| 5,164,661 A | * | 11/1992 | Jones ......................... 324/762 |
| 5,172,049 A | | 12/1992 | Kiyokawa et al. |
| 5,198,753 A | | 3/1993 | Hamburgen |
| 5,228,502 A | | 7/1993 | Chu et al. |
| 5,289,117 A | | 2/1994 | Van Loan et al. |
| 5,294,830 A | | 3/1994 | Young et al. |
| 5,315,240 A | | 5/1994 | Jones |
| 5,420,521 A | | 5/1995 | Jones |
| 5,591,269 A | * | 1/1997 | Arami et al. ............ 118/273 R |
| 5,744,863 A | * | 4/1998 | Culnane et al. .............. 257/712 |
| 5,847,366 A | * | 12/1998 | Grunfeld ..................... 219/497 |

* cited by examiner

Primary Examiner—Safet Metjahic
Assistant Examiner—T. R. Sundaram
(74) Attorney, Agent, or Firm—Samuels, Gauthier & Stevens

(57) ABSTRACT

A thermoconductive module to control the temperature of a DUT including a top surface having an area and a topography comprising, in combination, a heat exchange surface for interfacing and engaging with the top surface of the DUT, a plurality of individually moveable elements arranged throughout the area of the top surface of the DUT for moving the heat exchange surface to contour the heat exchange surface to map the topography of the top surface of the DUT and means in thermal communication with the heat exchange surface for producing the heat transfer between the top surface of the DUT and the heat exchange surface.

10 Claims, 3 Drawing Sheets

FLEXIBLY SUSPENDED HEAT EXCHANGE HEAD FOR A DUT

The present invention relates broadly to the field of integrated circuit (IC) or chip manufacture and use and particularly to a device for precisely controlling and measuring the temperature of a device under test (DUT).

During manufacture by the chip maker, chips typically undergo three separate test cycles: (1) in-process testing, such as continuous monitoring of sheet resistivities, junction depths, and other pertinent device parameters, such as current gain and voltage breakdown; (2) a preliminary electrical testing called burn-in; and (3) a detailed final testing for reliability and performance to grade or sort the chips. The present invention relates to improvements in the last type of testing.

The final testing of chips is one of the more expensive and time consuming stages of the manufacturing process. Automatic high speed testing is practically mandatory to the final testing of modern chips because a large number of complex tests are required to check even the simplest types of circuits.

After burn-in, it is conventional for the chips to undergo a number of functional tests to evaluate their performance. One by one, each chip is subjected to a series of long and short functional tests. The number and complexity of these functional tests varies from chip maker to chip maker. Long functional testing of digital memory chips generally involves the pattern testing of each chip on an individual basis. Commonly used routines are checkerboard patterns of 1s and 0s or floating of a 1 or 0 from cell to cell while the adjacent cells are maintained in the opposite state. For larger memories, the generation of these test patterns requires a larger number of functional tests. Generally, the time required for adequate pattern testing increases at a rate which is proportional to the square of the number of bits of storage in the digital memory chip. As the bit storage capacity of a digital memory chip increases, the time required for adequate pattern testing increases at an exponential rate.

Short functional testing of chips involves the testing of each chip on an individual basis to determine whether it meets the specs set down in the data sheet, e.g. operating speed, and voltage and current parameters. These so-called short functional tests generally require much less testing time than pattern testing. Both the long and short functional tests have heretofore been performed by chip makers in various sequences and at various temperature levels. After the functional tests are completed, the chips that have satisfactorily undergone all tests are subjected to quality control testing.

In this third stage, the functional tests are designed to test the chips at a constant temperature, usually the junction temperature. For chips with low power dissipation, eg <1 watt, maintaining the temperature constant by convection, flowing a fluid (air stream) across a DUT surface, is usually sufficient.

As transistor densities and counts (per chip) continue to increase, the power dissipation ($P_D$) of a chip increases markedly. $P_D$ also increases, proportionately, with increasing clock rate (for the common CMOS devices). The vast majority of digital systems change their internal states in synchronism with a square wave or clock signal common to the entire chip. Performance or useful work performed by a chip per time (R), is usually directly proportional to the clock rate or frequency. Current and proposed design $P_D$'s are becoming prohibitive (the chips are getting too hot).

Chips are designed to operate in highly temperature variable environments. The heat generated by a chip affects its temperature and thus feedback exists. It is always desirable to operate the chip at a constant internal temperature (junction temperature). Typically, this internal temperature is set to be less than the maximum allowable to allow for the violability and power consumption goals of the chip design. With the testing of the current and the expected proposed chip designs, the total heat impinging on the chip increases significantly (due either to external temperature increases or to increases in the system clock frequency).

When a chip is performance tested at its maximum capacity and maximum system clock frequency, it is necessary to control the ambient temperature to maintain the junction temperature of the chip constant in order to provide a reliable frame of reference or standard against which each chip is tested. When a chip is tested, it is referred to as a device under test (DUT).

Therefore, as the ability of chip manufacturers to reduce the physical size of chips has improved, the power dissipation in the chips so manufactured has accordingly increased. As a result, when the DUTs are tested, it has become increasingly necessary to provide some form of cooling to maintain the DUT at a constant temperature, usually its junction temperature.

Generally, the prior art systems are not capable of precisely controlling the DUT temperatures at >3–5 watts of power dissipation.

Presently, there are two major problems in precisely controlling the temperature of a DUT. In the third stage of testing as described above, the power dissipation inherent in current chips (and future chips) is high. The corresponding heat generated must be removed substantially simultaneously (heat sink). In correlation with the rapid heat removal is the requirement of precise monitoring and control of the DUT temperature at the desired test temperature.

Therefore, one major problem faced is to establish a superior heat transfer relationship between the DUT and a heat exchange module which engages the DUT.

The other manor problem is to measure and control the temperature of the DUT. With regard to this latter problem, various approaches are known in the prior art for measuring heat flow. One such approach is illustrated in U.S. Pat. No. 3,720,103 which relates to a heat flux meter. In that device, thermocouples are used to measure the temperature difference between two surfaces. The sensed temperature difference controls a heater which is adjusted so that heat flow between the surfaces is prevented. The first surface is shielded from the environment to prevent heat flow therefrom to this surface. This device, however, is not suitable for measuring the performance of a cooling device such as a heat sink or heat transfer device used in a semiconductor module for cooling a semiconductor chip or the like.

Another method is illustrated in U.S. Pat. No. 3,745,460. In this approach, a current pulse is fed into the semiconductor causing heat to be generated therein. The detected time interval between cessation of the pulse and detection of maximum heat transfer leads to a determination of the thermal resistance.

A further method is described in U.S. Pat. No. 4,396,300. The apparatus includes an electric heater for heating a block which surrounds and engages part of the tube. A liquid is pumped through the tube and a thermistor is used to measure the fluid temperature. A pressure drop sensor is provided to sense the drop in pressure across the block. The sensed data is transferred to a computer for computing the heat transfer resistance. Like the other approaches mentioned above, this method too is not suitable for determining the effectiveness of a heat transfer device used in a module to cool a DUT.

However, these other problems of accurate and effective temperature control of a DUT during 'burn in' were overcome in my earlier issued U.S. Pat. Nos. 5,126,656; 5,164,661; 5,315,240 and PCT Publication WO94/22029 which are hereby incorporated by reference in their entireties into this disclosure. That is, my earlier work and inventions for the control and measurement of a DUT during 'burn in' are applicable to the control and measurement of the temperature of a DUT during the functional testing (third stage) of a DUT.

The present invention overcomes the one major problem heretofore described and is directed to a device which establishes a superior heat-transfer relationship between a DUT and a heat-exchange device. Although the invention will be described with reference to chips (ICs), the thermoconductive module is also applicable for the testing of other devices such as hybrids, multi-chip modules, dc/dc converters, etc.

Broadly, the invention comprises a thermoconductive module which provides for superior conductive heat transfer from a DUT. The module comprises a housing having a heat exchange chamber. A flexible heat exchange plate is secured to the housing and interfaces with the exposed surface of the DUT. The plate is in thermal communication with the heat exchange chamber. The plate is biased outwardly from the housing such that the plate maps the topography of the surface of the DUT. A DUT sensor in the housing measures the temperature of the DUT. A sensor in the housing measures the temperature of the heat exchange fluid. Based on the readings from these two sensors, the flow of the heat exchange fluid is controlled.

In a preferred embodiment, the surface is secured to the housing by at least one flexible web bellows. To ensure that the heat exchange plate maps the contour of the DUT surface, a vacuum is drawn in the interface between the heat exchange plate and the engaged surface of the DUT.

Broadly, the invention comprises a thermoconductive module which provides for superior conductive heat transfer from a DUT. The module comprises a mixing assembly wherein fluids at different temperatures and flow rates can be introduced and combined. The fast response time of the module is due to the mixing of the fluids within the module. Without this mixing in the module, the time lag would be unacceptable in many applications. A heat exchange surface, which includes a heat exchange chamber, is biased outwardly from the mixing assembly. The heat exchange assembly has a flexible heat exchange plate which engages the top surface of a DUT. The heat exchange plate is in thermal communication with the heat exchange chamber. The plate is biased outwardly from the heat exchange chamber such that the plate maps the topography of the surface of the DUT. In a preferred embodiment, a vacuum is drawn in the interface between the heat exchange plate and the surface of the DUT to ensure maximum surface contact. A sensor in the heat exchange assembly which is thermally isolated from the heat exchange fluid measures the temperature of the DUT. The sensor in the heat exchange fluid measures the temperature of the heat exchange fluid. Based on the readings from these two sensors the flow of the heat exchange fluid is controlled to maintain the temperature of the DUT at a target temperature, typically the case temperature but also the junction temperature if desired.

Although the preferred embodiment will be described with reference to drawing a vacuum between the heat exchange plate and the surface of the DUT, depending upon the device being tested and the testing conditions, a vacuum is not always necessary. However, even if the vacuum is not used during the test cycle, the vacuum concept is also advantageously employed with the module to pick up devices by means of the vacuum. This allows devices to be engaged and transferred and disengaged without a mechanical device other than the vacuum feature of the module.

In a preferred embodiment, a plurality of spring biased pins engage the heat exchange plate. This allows the plate to contour to the surface of the DUT.

DESCRIPTION OF THE PREFERRED EMBODIMENT(S)

Figure 1:
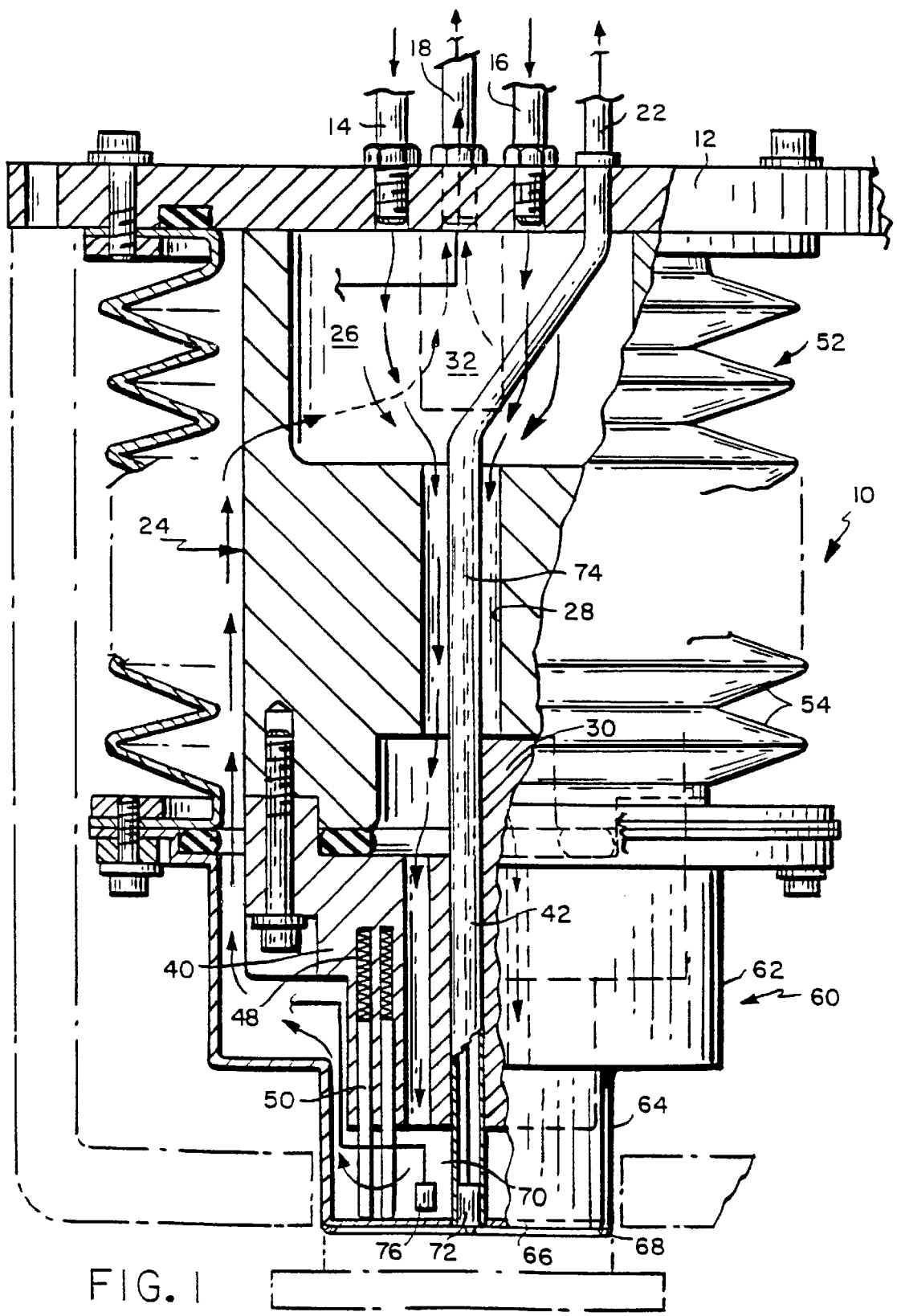
FIG. 1 is a front, partially sectional view of a thermoconductive module of the invention.

Referring to FIG. 1, a thermoconductive module is shown generally at 10. The module comprises a support plate 12 having an inlet 14 and an inlet 16. Fluids, e.g. water, may be introduced into the inlets at the same or different temperatures. Also secured to the support plate are outlets 18 and 20 (not shown) to remove heat exchange fluid from the module as will be described. Lastly, secured to the support plate 12 is a vacuum outlet 22.

Figure 3:
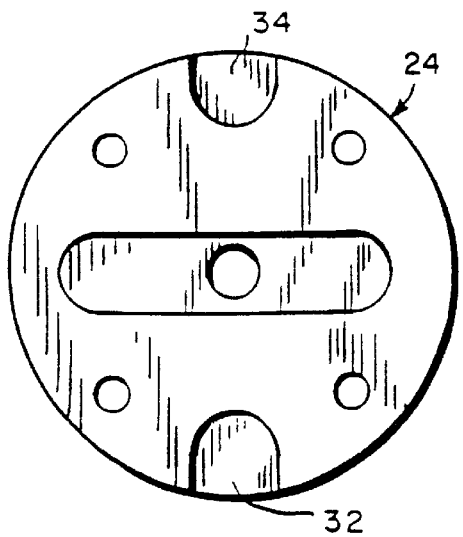
FIG. 3 is a top view of the mixing assembly of FIG. 2.
Figure 2:
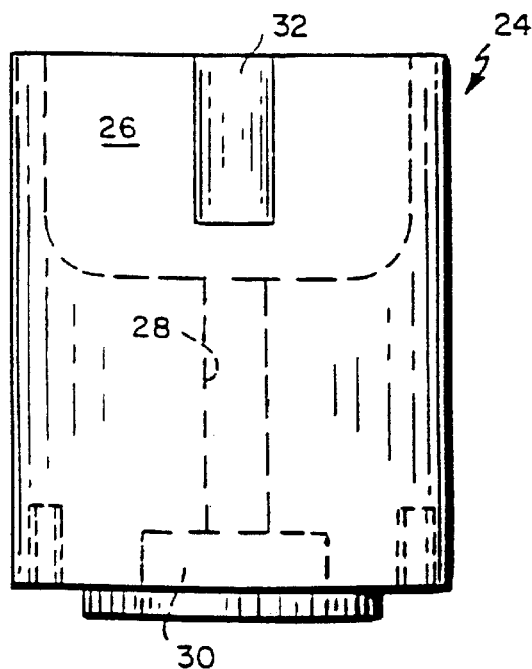
FIG. 2 is a front view of a mixing assembly.

Depending from the support plate 12 is a mixing assembly 24, also shown in FIGS. 2 and 3. The mixing assembly comprises a mixing chamber 26 in communication with the inlets 14 and 16, a conduit 28 and a distribution head 30. Return channels 32 and 34 are formed in the outer surface of the walls of the mixing assembly 24 and communicate with the outlets 18 and 20.

Figure 4:
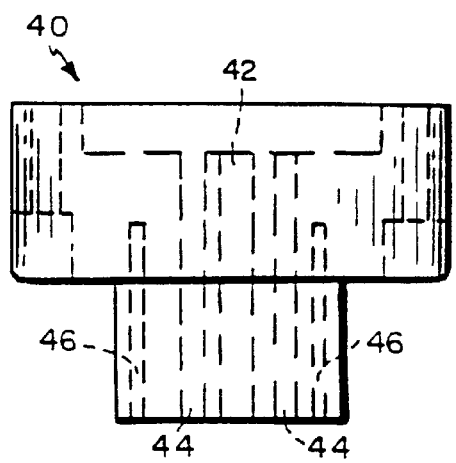
FIG. 4 is a front view of a pin block assembly.
Figure 5:
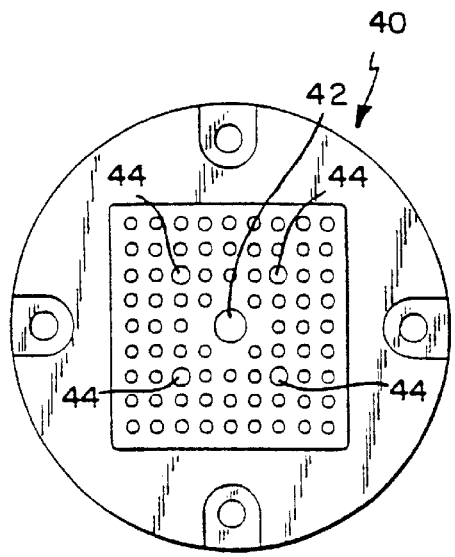
FIG. 5 is a bottom view of the pin block assembly of FIG. 4.

Referring to FIGS. 1, 4 and 5, depending from the mixing assembly 24 is a pin block assembly 40. The pin block assembly 40 is characterized by a central through aperture 42 and four equally spaced feed conduits 44, shown most clearly in FIG. 5. The pin block assembly 40 further comprises cylindrical recesses 46 in which are received springs 48. Lastly, pins 50 are received in the cylinders 46 and are biased outwardly from the pin block assembly by the springs 48.

Referring to FIG. 1, a flexible wall 52 comprising bellows 54 is secured at one end to the support plate 12. Secured to the flexible wall at its other end is a heat exchanger 60 having an upper wall 62 and a reduced lower cylindrical wall 64. Secured to the lower wall 64 is a flexible heat exchange plate 66. A gasket 68 is secured to the heat exchange plate 66. In an alternative embodiment, where a vacuum is not necessary in the test cycle or the module is not to be used for moving devices, the gasket 68 is not required.

The heat exchanger 60 defines with the pin block assembly 40, a heat exchanger chamber 70. As shown, the pins 50 pass through the heat exchange chamber 70 and contact and bias outwardly the heat exchange plate 66. The pins 50, in addition to ensuring flush engagement of the heat exchange plate 66 with the top surface of the DUT, also provide baffling for the heat exchange fluid flowing therethrough as will be described. Pins 50 also provide for additional heat transfer from the plate 66 to the pins 50 to the fluid.

Extending through the heat exchange plate is a thermocouple 72 which is biased outwardly. The thermocouple, as described in my aforementioned patents, is thermally isolated from the heat exchange chamber. A vacuum line 74 is sealingly secured to the heat exchange plate 66 and extends through the central aperture 42 and the mixing assembly 24 and connects to the vacuum outlet 22. Extending into the heat exchange chamber is a thermocouple 76. The thermocouple 76 is attached to an arm 77 which in turn is secured to the bottom of the pin block assembly 40. The paired wires for the thermocouple 76 return through the return channel (shown as a single line for clarity) and into the outlet 18. The paired wires are removed from the outlet 18 in a seal tight manner.

The paired wires for the thermocouple 72 travel through the vacuum line 74 and then are removed (not shown) from the vacuum line in a seal tight manner after they pass through the support plate 12.

Figure 6:
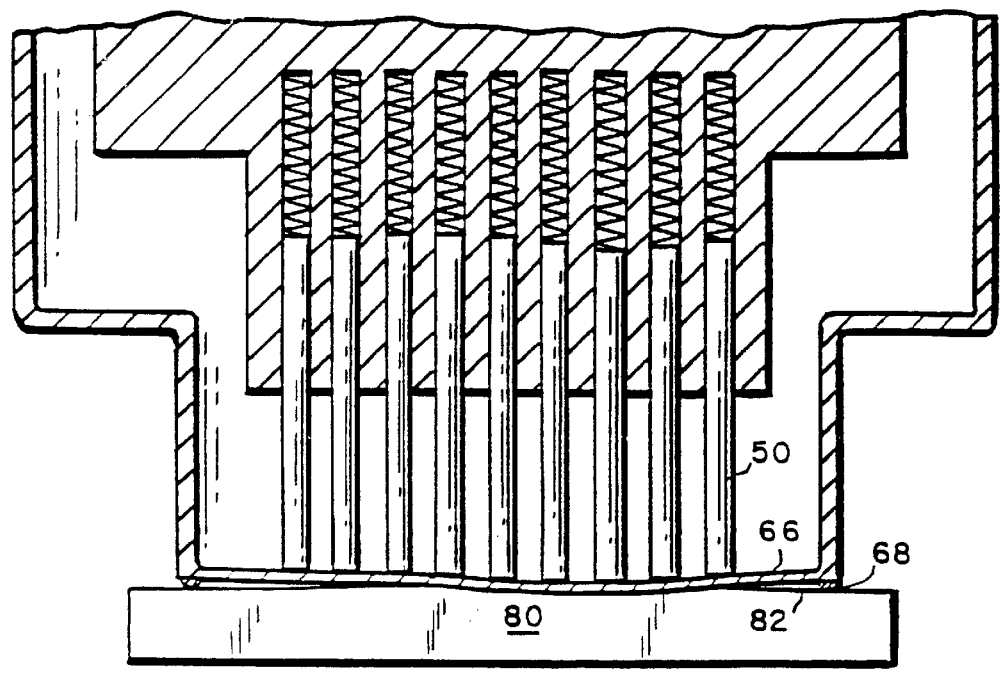
FIG. 6 is an illustration of the interface between a heat exchange plate and the top surface of a DUT.

Referring to FIG. 6, a DUT 80 is represented as a three dimensional solid body. For reasons of clarity, connecting pins in the substrate on which the chip is mounted are not shown. The DUT is seated in a tester of the manufacturer's specification which performs the functional test on the DUT.

As shown, when the heat exchange plate 66 engages the DUT, it maps the top surface. Additionally, a vacuum is drawn at the interface for improved thermal performance and for device pick up if required.

Figure 7:
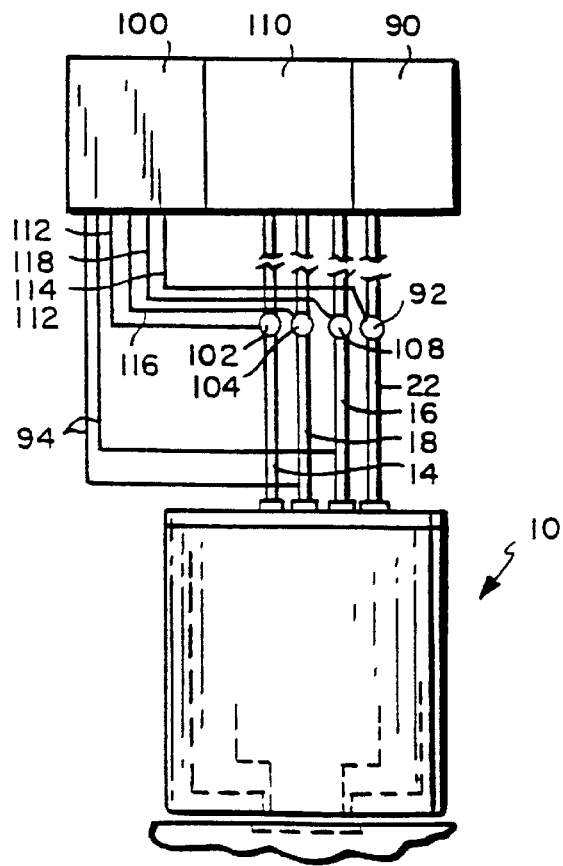
FIG. 7 is a block diagram of a system embodying the invention.

Referring to FIG. 7, the thermoconductive module 10 of the invention is shown schematically in a system. The heat exchange plate 66 of the module is interfaced with a DUT as shown in FIG. 6. The vacuum line 22 communicates with a vacuum source 90 and the vacuum is controlled by valve 92. The paired wires from the thermocouples 72 and 76 (shown schematically in FIG. 1) are shown collectively as 94 and communicate with a programmable logic controller 100. The heat exchange fluid inlet and outlet conduits 14, 16 and 20 communicate with a source of heat exchange fluid 110 and have associated valves 102, 104, 106 (not shown) and 108 respectively. These valves communicate with the controller 100 via lines 112, 114, 116 (not shown) and 118.

The heat exchange supply 110 includes first and second reservoirs (not shown) to maintain separate sources of heat exchange fluid at separate temperatures. Also, the return conduits 18 and 20 flow to a reservoir for later recycling and/or reuse.

As hereinbefore mentioned, the use of the two thermocouples, one to measure the temperature of the DUT and the other to measure the temperature of the body of the heat exchange device to control the temperature of the DUT based on the readings from the thermocouples, is set forth in detail in my aforementioned patents and publication. In the present application, the thermocouple 76 reads the temperature of the heat exchange fluid rather than the temperature of a heat exchange device. Also, the control of the flow rates of heat exchange fluids based on sensed temperatures is well within the skill of the art.

The operation of the invention will be described with reference to a DUT 68 with a power dissipation of 0 to 100 watts. The DUT has a top surface area 82 of approximately 6.45 cm² (one in²). The DUT must be maintained at a junction temperature of 85° C. for 5 minutes.

The DUT 80 is seated in a tester as shown in FIG. 7. The thermoconductive module 10 is placed into contacting engagement with the top surface 82 of the DUT 80. Any suitable device may be used to effect this placement such as a robotic hand, pneumatic rods, etc., it being understood (referring to FIG. 7) that the conduits 14, 16, 18, 20, and 22 are flexible. The heat exchange fluid used for this illustrative embodiment is water. The heat exchange plate 66 is preferably stainless steel 25.4 $\mu$m (0.001") thick with an outside surface coating of a precious metal, such as gold, in a thickness of about 50 millionths. The thermocouple 72 engages the top surface of the DUT and measures its temperature.

The bellowed wall 52 allows the heat exchange plate 66 to move with reference to the support plate in a gimbal-like fashion. As shown in FIG. 6, the pins bias the plate 66 to ensure maximum surface contact between the heat exchange plate and the top surface of the DUT 80. The pogo pins 50 allow the heat exchange plate 66 to map the topography of the surface 82. For this specific example described herein, the pogo pins are uniformly arrayed such as shown in FIG. 5 and each has a spring tension of approximately 0.139N (0.5 ounces).

A vacuum is drawn through the conduit 42 in a range of 98.2 kPa (29 in Hg). Water flows through the inlet 14 at a flow rate of about 1 gpm and at a temperature of about 60° C. Water flows through the inlet 16 at a temperature of about 20° C. and a flow rate of 1 gpm. The water is mixed in the mixing chamber 26, flows through the conduit 28 and into the distribution head 30. The mixed water then flows through the four feed conduits 44 and into the heat exchange chamber 70. The water leaves the heat exchange chamber, flows through the return channels 32 and 34 and then to the outlets 18 and 20. Once the system has reached equilibrium, the tester commences the functional testing of the DUT.

Based on the readings from the thermocouples 72 and 76, the flow rates and temperatures of the water through the inlets 14 and 16 will change to ensure that the DUT is maintained at its junction temperature. For this specific example, the flow rate of the cooler water would increase from the initial flow rate just described while the flow rate of the warmer water would decrease from the initial flow rate just described. The flow rates will vary during the test period.

Although described in reference to water as the heat exchange fluid, other fluids such as silicone oils, flourinets, glycols, etc. may be used.

What is claimed is:

1. A thermoconductive module to control the temperature of a DUT including a top surface having an area and a topography comprising, in combination:

a heat exchange surface for interfacing and engaging with the top surface of the DUT; a plurality of individually moveable elements arranged throughout the area of the top surface of the DUT for moving the heat exchange surface to contour the heat exchange surface to map the topography of the top surface of the DUT to ensure maximum surface contact between the heat exchanger surface and the top surface of the DUT; and means in thermal communication with the heat exchange surface for producing heat transfer between top surface of the DUT and the heat exchange surface, with the mapping of the topography of the top surface of the DUT by the heat exchange surface maximizing the heat-transfer relationship between the heat exchange surface and the top surface of the DUT.

2. The thermoconductive module of claim 1 wherein the heat exchange surface is formed by a flexible heat exchange plate having one and another side, with the one side interfacing and engaging with the top surface at the DUT, with the flexible heat exchange plate being separately formed from the plurality of individually moveable elements which contact the other side of the flexible heat exchange plate.

3. The thermoconductive module of claim 1 wherein the producing means comprises a heat exchange chamber for receiving a heat exchange fluid, with the flexible heat exchange plate defining a wall of the heat exchange chamber.

4. The thermoconductive module of claim 3 wherein the plurality of individually moveable elements are arranged in an array throughout the area of the top surface of the DUT.

5. The thermoconductive module of claim 4 further comprising, in combination:

a block assembly moveable relative to the DUT, with the plurality of individually moveable elements mounted to the block assembly.

6. The thermoconductive module of claim 5 wherein the individually moveable elements are mounted for movement relative to the block assembly perpendicular to the top surface of the DUT.

7. The thermoconductive module of claim 6 wherein the individual moveable elements are biased relative to the block assembly.

8. The thermoconductive module of claim 5 wherein the individually moveable elements are slidably mounted relative to the block assembly for independent reciprocating movement.

9. The thermoconductive module of claim 5 wherein the plurality of individually moveable elements provide heat transfer between the heat exchange surface and the producing means.

10. The thermoconductive module of claim 1 further comprising in combination:

means for drawing a vacuum between the top surface of the DUT and the heat exchange surface.

* * * * *